United States Patent [19]

Ekdahl

[11] 4,117,629
[45] Oct. 3, 1978

[54] POT HOLDING ARM SUPPORT

[76] Inventor: Paul Ekdahl, Dutch Lane Rd., Freehold Township, Monmouth County, N.J. 07728

[21] Appl. No.: 823,120

[22] Filed: Aug. 9, 1977

[51] Int. Cl.² ............................................. A01G 9/02
[52] U.S. Cl. ....................................... 47/67; 211/107; 248/214
[58] Field of Search ................. 47/67; 211/107, 104, 211/113, 117; 248/27.8, 157, 159, 214, 215, 218.4, 225.3, 230

[56] References Cited

U.S. PATENT DOCUMENTS

| | | | |
|---|---|---|---|
| 2,716,533 | 10/1950 | Freeman | 211/107 |
| 2,979,301 | 3/1958 | Reveal | 248/214 |
| 3,194,403 | 7/1965 | Van Horn, Jr. | 211/107 X |
| 3,332,654 | 7/1967 | Jacobson | 211/107 |
| 3,374,978 | 3/1968 | Salmon et al. | 211/107 |
| 3,731,429 | 5/1973 | Orthman | 211/107 |
| 3,734,438 | 5/1973 | Kautz | 211/107 |
| 3,866,758 | 2/1975 | Strassle | 211/107 |
| 3,978,612 | 9/1976 | Young | 47/67 |
| 4,037,729 | 7/1977 | Desisto | 248/214 X |

FOREIGN PATENT DOCUMENTS

| | | | |
|---|---|---|---|
| 791,606 | 12/1935 | France | 211/107 |
| 2,206,067 | 8/1973 | Fed. Rep. of Germany | 211/107 |
| 300,555 | 9/1932 | Italy | 211/107 |
| 579,242 | 8/1958 | Italy | 211/107 |

Primary Examiner—E. H. Eickholt
Attorney, Agent, or Firm—Patrick J. Pinto

[57] ABSTRACT

A pot holding arm is removably secured to a semicircular receiving member in one of a plurality of retaining pockets and cooperating positioning slots. In one embodiment a semicircular casting has a plurality of pockets and a slot in association with each pocket. These slots are adapted to receive and retain a pot holding arm. This semicircular member may be secured to a wall or to another similar portion to form a circular member. In one embodiment it may be clamped to a pipe and in another embodiment may be slightly larger so that it may be rotated on the pipe or post. This rotating circular member is longitudinally retained on the pipe by an attached collar. In another embodiment the semicircular cast member has extending T-forms but without a retaining bottom portion. A pot holding arm as used with each of these extending T-forms has a limit stop so that this arm does not slide below a determined point on the receiving and retaining member.

20 Claims, 13 Drawing Figures

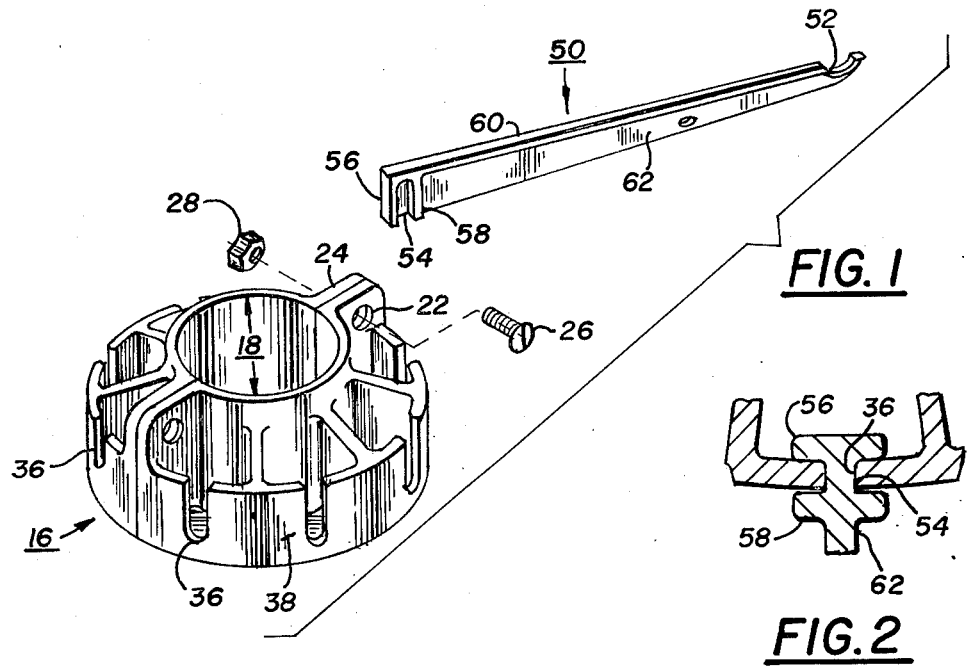
FIG. 1
FIG. 2
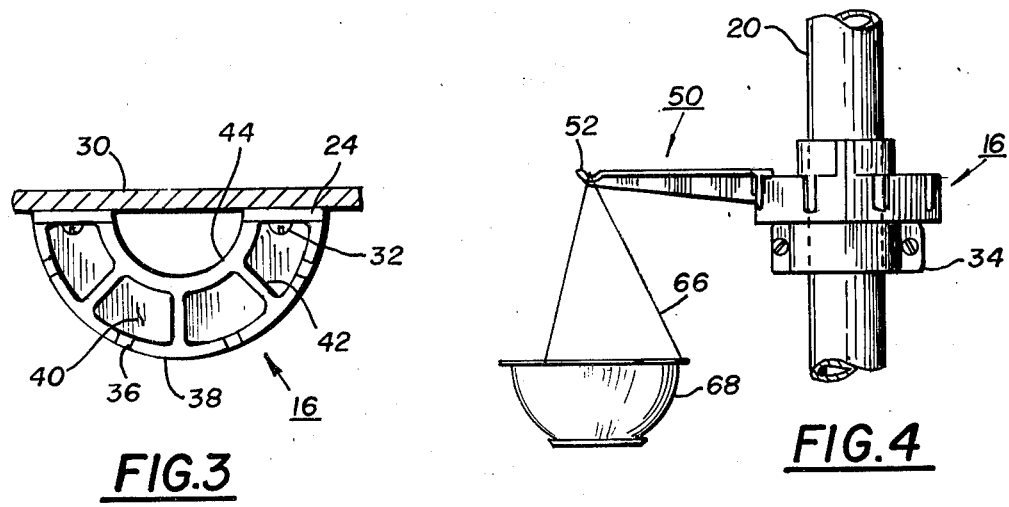
FIG. 3
FIG. 4
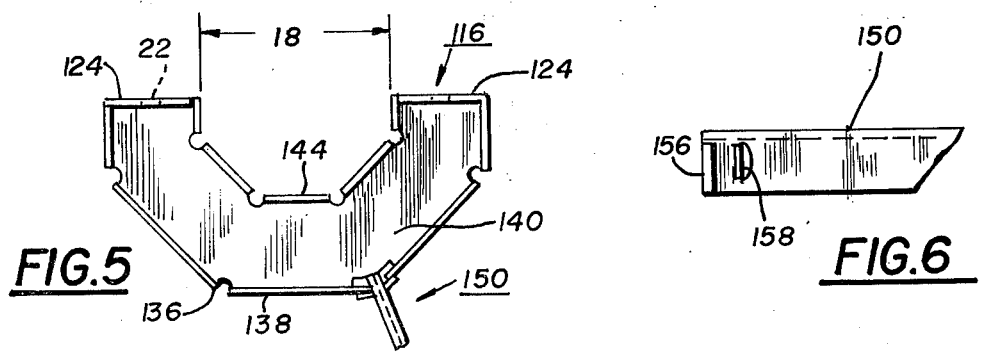
FIG. 5
FIG. 6

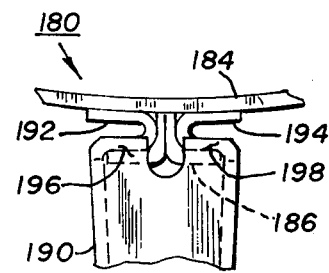
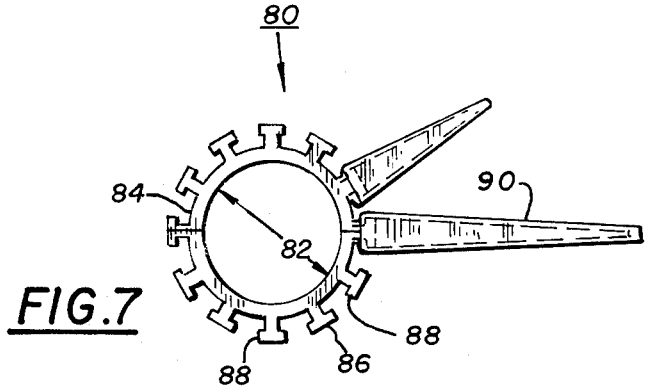
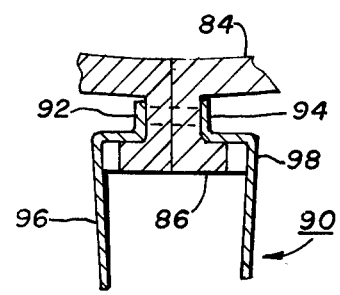
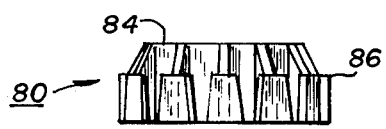
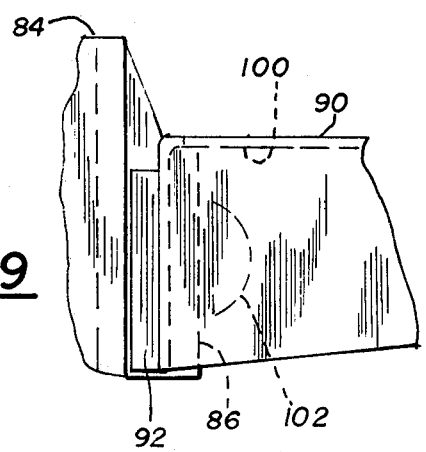
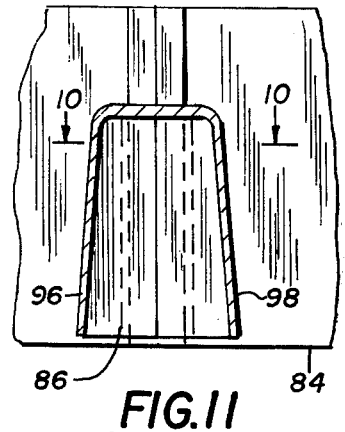
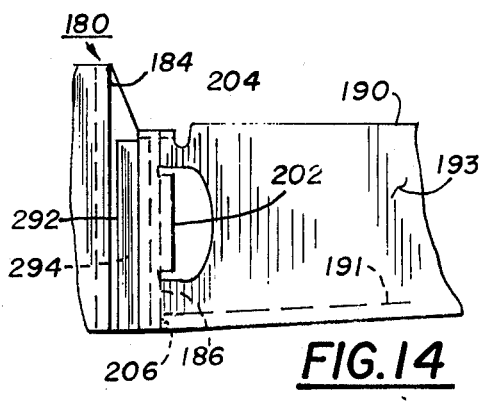
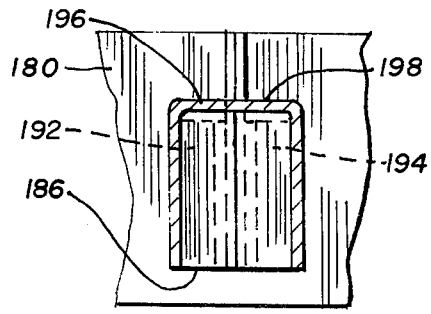

POT HOLDING ARM SUPPORT

BACKGROUND OF THE INVENTION

1. Field of the Invention

With reference to the classification of art as established in the United States Patent and Trademark Office the present invention is believed to be found in the general Class entitled, "Plant Husbandry" (Class 47) and in the subclass entitled, "plant stands-window" (subclass 40) and the further subclass entitled, "plant receptacles-hanging" (subclass 35).

2. Description of the Prior Art

Flowerpot holders and suspending brackets are old and well known. Several patents directed toward the suspension of flowerpots, etc. have been issued and of note is U.S. Pat. No. 914,387 to CRAGO as issued on Mar. 9, 1909, U.S. Pat. No. 1,185,404 to HUGHES, etal., as issued on May 30, 1916, U.S. Pat. No. 2,650,055 to PERKINS as issued on Aug. 25, 1953 and more recently U.S. Pat. No. 3,747,268 to LINDER as issued on July 24, 1973 and U.S. Pat. No. 3,978,612 to YOUNG as issued on Sept. 7, 1976.

In these and other known patents and showings in public use, as far as is known, there is no showing or provision of a semicircular casting or formed receptacle having a plurality of receiving pockets or slots forming T-shaped portions into which or on which a pot holding arm is removably secured or mounted. The semicircular receptacle is preferably made as a casting but may also be formed from a strip of metal or plastic as a die-shaped portion.

As a receptacle this semicircular receiving member may be secured to a wall or when joined to a like member form a circular retainer for mounting to a pole and the like. This circular retainer may be made with a passageway which is a tight fit on a pole or post or may be a slide fit on a pole or post and in association with a clamp ring the retainer is supported on the pole or post in a rotating condition.

The pot-holding arm may be of any desired length and on its outer end has a hook or hole for securing and/or supporting a chain, wire form or the like. This arm may be a casting or a stamping from a die. The securing end of this arm may have flange portions that engage the receiving member on both sides of the slot or, in another embodiment, engage a T-member portion of the receiving member. On each arm there is provided a stop means to limit the downward movement of the arm on the T-member portions of the receiving member.

SUMMARY OF THE INVENTION

This invention may be summarized at least in part with reference to its objects.

It is an object of this invention to provide, and it does provide, a semicircular receiving receptacle with provision for securing to a wall or to a like receiving receptacle to form a circular member with a plurality of like slots forming a receiving means for the end of a pot-holding arm. Each arm is removably mounted in a slot with retaining means to limit the downward position of the arm in the slot.

It is a further object of this invention to provide, and it does provide, a semicircular retainer half which may be a cast member or constructed from a stamped and formed strip of metal or plastic. A plurality of slots are formed in each semicircular retainer. Each slot is adapted to receive and retain an end of a removably mounted pot-holding arm. This arm is of a selected length with the retained end entering into the slot only a restricted amount. The outer or unsupported end of the arm has a provision to retain the bail or chain of a flowerpot or the like.

As to be hereinafter more fully described, the receiving member of the pot-holding assembly has a plurality of slots formed in a semicircular portion. Two embodiments of receiving members are shown. In one embodiment the slots terminate at a bottom web or shelf which provides a stop for the slot engaging portion of the arm. In the other embodiment the slots extend through the receiving member and stop means are provided on each arm. The receiving member and arms may be a casting of metal or plastic or may be a stamping of metal or plastic. The receiving member may be secured to a wall or when two portions are fastened together they form a ring-like or tubular member which may be clamped on a pole or post, or when slidable thereon a separate clamp collar is provided to retain this receiving member axially on the pole while this ring-like receiving member is rotatable therearound.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of the receiving arm and member as adopted for use in holding flowerpots and the like and showing a preferred means for supporting the arm. This specific embodiment and an alternate embodiment thereof have been chosen for the purposes of illustration and description as shown in the accompanying drawings wherein:

BRIEF DESCRIPTION OF THE DRAWINGS

FIG. 1 represents an isometric view, partly exploded, showing a preferred pot-holder assembly including a pair of receiving members arranged to form a circular collar and an arm adapted for mounting in one of the slots in the receiving member;

FIG. 2 represents a plan view in an enlarged scale of a slot portion of a receiving member and an end of an arm in mounted condition, this view shown partly in section to more clearly define the retaining relationship of the interrelated components;

FIG. 3 represents in a scale similar to that of FIG. 1, a plan view of a semicircular receiving member secured to a wall portion;

FIG. 4 represents in a reduced scale and somewhat diagrammatic, a side view of the assembly of FIG. 1 with the arm supporting a pot and a collar providing a vertical stop permitting rotary motion of the receiving member around a pole;

FIG. 5 represents a plan view similar to that of FIG. 3 and showing a receiving member made by a die from sheet material such as steel;

FIG. 6 represents a side view partly fragmentary of an arm as made by a die from folded sheet material such as steel;

FIG. 7 represents a plan view, somewhat diagrammatic and showing an alternate construction of the receiving member and arms therefor, these arms, as shown, having two differing lengths;

FIG. 8 represents a side view of the receiving member of FIG. 7 and absent the arms used therewith;

FIG. 9 represents in a fragmentary, partly diagrammatic, side view in an enlarged scale, a T-member portion of the receiving member and a mounting end of a supporting arm;

FIG. 10 represents a fragmentary, partly diagrammatic, plan view of the T-member portion of the receiving member and arm of FIG. 9;

FIG. 11 represents a fragmentary, partly diagrammatic, front view of the T-member of the receiving member and arm of FIG. 9;

FIG. 12 represents a fragmentary, partly diagrammatic, plan view of an alternate T-member construction and arm, this alternate construction showing a small change in the configuration of the T-member and arm;

FIG. 13 represents a fragmentary, partly diagrammatic, front view of the alternate T-member portion and arm of FIG. 12, and FIG. 14 represents a side view partly fragmentary of a receiving member such as in FIG. 7 and an arm formed of sheet material such as steel.

In the following description and in the claims various details are identified by specific names for convenience. These names are intended to be generic in their application with corresponding reference characters referring to like members throughout the fourteen Figures of the drawings.

The drawings accompanying, and forming part of, this specification disclose certain details of construction for the purpose of explanation of the invention, but it should be understood that structural details may be modified in various respects without departure from the concept of the invention and that the invention may be incorporated in other structural forms than shown.

DESCRIPTION OF THE EMBODIMENT OF FIGS. 1 THROUGH 4

Referring now to the drawings and in particular to FIGS. 1 through 4, there is depicted an arm receiving and retaining member generally identified as 16. This member is preferably formed as a semicircular configuration having an inside diameter 18. This diameter may be a grip fit on the outer diameter of a pipe, pole or post 20 such as that shown in FIG. 4. Apertures 22 in ear portions 24 in member 16 are aligned for the insertion therethrough of the threaded shank of a cap screw 26. A nut 28 is tightened on this threaded shank of the screw to draw the two semicircular members together. As depicted, there are two apertures 22 in each member portion requiring two screws and nuts 26 and 28 per circular assembly. These apertures 22 may be used to mount a semicircular retaining member 16 to a wall 30. Screws 32 may be used to secure member 16 to wall 30. The diameter 18 may be a slip or slide fit on the pipe, pole or post 20 in which case a support collar 34 is supplied and affixed to the pipe, pole or post 20 at the selected height. This collar 34 may be two like halves drawn into clamped condition by screws 26 and nuts 28 or may be any other collar of suitable construction or attachment.

Each retaining member 16 has a plurality of slots 36 which are formed in the outer wall 38. These slots terminate at a lower, closed end portion 40. Ribs 42 extend between the outer wall portions 38 and an inner wall 44. This construction as a casting provides a pocket with slot 36 as an outside opening thereto. Into a slot 36 and the engaging wall portions 38 on each side of this slot is inserted a mounting end of an arm 50. As illustrated, this arm is a casting having its outer end 52 formed to provide a hook. The other or inner end of this arm is formed with a central web 54 from which inner and outward ribs 56 and 58 extend. A top rib or stiffener 60 extends more-or-less the full extent of the arm 50. A downwardly extending intermediate web 62 may be provided, if desired.

As seen in FIG. 2, when the arm 50 is mounted in a slot 36, the outer rib 56 is against or engages the inside of the outer wall portion 38. The outward rib 58 engages the outer surface of wall portions 38 while the top 60, as seen in FIGS. 1 and 4, engages the top of wall 38 to limit the downward travel of the arm 50 into the slot 36. If desired, the web 54 can be made of sufficient length to engage the bottom of the slot 36 before the wall portions 38 engage the top rib 60 of the arm 50.

As seen in FIG. 4, the arm 50 is removably mounted in one of the slots 36 in retaining member assembly 16. A bail or wire 66 is secured to a pot or bowl 68 and the midlength of this bail 66 is placed in the hook portion 52 of the arm. As shown, the retaining assembly 16 is supported by clamp 34 so assembly 16 is fully movable around the pole or pipe 20.

If desired, the semicircular retaining member 16 can be made as a die form with or without a bottom to make up the closed end portion 40. Arm 50 can also be made by a blanking and forming die. When a slot 36 is to be provided, then ribs 56 and 58 as well as web 54 must be provided. Instead of a hook 52, holes for securing wires or bails 66 can be provided.

The arm may be formed of sheet metal folded to provide the desired stiffness and with tabs cut and bent from midportions to provide rib portions corresponding to ribs 58. End portions may be bent outwardly to form ribs corresponding to ribs 56. The folded material provides web 54 and the depth of slot 36 provides the downward travel stop for the arm 50. Rib stiffeners 42 in retainer 16 may be omitted.

In FIG. 5 is shown a receiving and retaining member 116 much like member 16 of FIG. 1. This member is depicted as made from sheet material such as metal and after blanking has a plurality of inner and outer tabs which are bent upwardly from a lower extent 140. End tabs 124 may each be formed with an aperture 22. The outer tabs 138 are so formed that slots 136 are provided therebetween. Inner tabs 144 form a series of chords which define a diameter 18. As in FIG. 1, this member may be clamped to a pipe 20 or rotably supported by a collar 34, as in FIG. 4.

In FIG. 6 an arm 150 is depicted as formed from sheet material such as steel. End tabs 156 are spaced from localized tabs 158 to provide a determined space therebetween. The folded length of the arm 150 is made sufficient for supporting a pot, not shown. The slot 36 or 136 terminates at the lower extent 40 of the casting in FIG. 1 or bottom portion 140 of the member 116 of FIG. 5. This bottom portion may provide a downward limit and a supporting shelf for the arm 150 of FIG. 6 when mounted in said slot.

EMBODIMENT OF FIG. 7 THROUGH 11

Referring to the drawings and FIGS. 7 through 11, there is shown an arm receiving and retaining member 80. As shown, this is a cast member of a semicircular configuration. This member is much like member 16 but has no bottom closure portion. The two halves are preferably retained to form a circular assembly as in FIG. 7 by means of bolts and nuts as in FIG. 1. Diameter 82 is merely a matter of selection and the retaining assembly may be clamped to a pole or pipe 20, as seen in FIG. 4, or may be a slip fit on said pole and retained in place by a collar 34.

As depicted, a ring portion 84 has a plurality of T-shaped, outwardly extending, attached portions 86. In the embodiment of FIGS. 7 through 11 the portions 86 are trapozidal in shape with the larger portion being toward the bottom or lower edge of the mounted member 80. Between these T-shaped portions 86 are provided slots 88 which allow easy placement and mounting of arm 90.

Arm 90 has its outer end formed to support a basket or bowl in the manner of FIG. 4. The inner end of this arm is made to snugly engage the T-shaped portion 86. As a casting or a formed member of sheet material, the inner end of the arm 90 is formed with inwardly directed angle portions 92 and 94 which engage the inner surfaces of a T-shaped member 86. Wall portions 96 and 98 are sized and formed to engage and be seated on the tapered sides of the T-shaped member 86. A top portion 100 may be provided as a stiffener and, if desired, may be used as a downward stop for the arm as and when mounted on the T-shaped member 86. As shown, the inwardly extending legs of portions 92 and 94 establish the cant or attitude of the arm 90 and the sides 96 and 98 establish the side attitude. If desired, tabs 102, shown in phantom outline in FIG. 9 may be provided so that the inward legs of portions 92 and 94 may be shortened to avoid engagement with wall 84. The engagement of the tapered T-shaped member 86 on its tapered sides, front and back by the tabs and legs of the end of the arm provides a positive mounting of arm 90 on member 86.

ALTERNATE EMBODIMENT OF FIGS. 12 AND 13

Referring next to the alternate embodiment of FIGS. 12 and 13, it is to be noted that the T-shaped members 86 of FIG. 11 are now made with straight sides and in FIGS. 12 and 13 are identified as 186. The receiving member is identified as 180. Arm 190 is preferably of sheet material, probably metal such as aluminum or clad steel. Inner ends 192 and 194 are made U-shaped and are sized to engage the outer face of a wall 184 and the inner faces of the T-shaped member 186. A stop to limit the downward movement of the arm 190 is provided by tabs 196 and 198 which engage the top of member 186. This stop can also be provided by a top portion of arm 190. This arm 190 may be positioned by the U-shaped inner ends 192 and 194 as they lay next to wall 184 and engage each other in a side-by-side arrangement.

It is to be noted that arms 50 can be used with retaining member 80 if the slot 88 and T-shaped member 86 is properly sized. In a like member, arm 90 or 190 may be used with the receiving member 16.

Referring finally to FIG. 14, it is to be noted that an alternate arm 190 is made of sheet material which as shown is a channel unit with a bottom portion 191 extending between side portion 193. In-turned ends 292 and 294 engage the under or inner faces of T-shaped member 186. Tabs 202 are displaced from the side portions 193 of arm 190 to engage the outer face of member 186. At least one top tab 204 is provided on the arm 190 and is bent inwardly to engage the top of member 186 to provide the downward stop of arm 190 on member 186. The bottom portion 191 may be terminated at 206 to provide an attitude establishing the shoulder of arm 190 against the outer surface of member 186.

The retaining member 180, as shown, is a casting or a stamping. Each retaining member is generally semicircular with means for connecting to a like member to form a circular unit. The arm, as depicted, is also a casting or stamping, removable mounting in a cooperatively formed retaining member.

It is to be noted that the planar portion 140 of the retainer 116 in FIG. 5 may have cutouts adjacent the outer tabs 138 so that the retainer can be mounted with the planar portion at the top of the assembly. Arm 190 in FIG. 14, instead of tab 202, may have inwardly extending tab ends such as 92 and 94 in FIG. 10 or ends 192 and 194 in FIG. 12.

What is believed to be new and novel is the providing of a semicircular receiving and retaining member having a plurality of like grooves and T-shaped portions. This retaining member can be formed to tightly clamp a pole, slide around a pole or, as a semicircular member, be secured to a wall. The arms to be used with the retaining member are of any desired length and either mount in a slot with engagement of the outer side walls of the retaining member by the end of the arm or mount on a T-shaped portion of the retainer. This arrangement provides ready removal of an arm, swinging of the arms for watering of the plants in the pot, or turning of a display to enable close inspection and/or selection of a plant or flower by a customer or attendant. Whether a casting of metal or plastic, or a stamped and shaped metal or plastic member, the retainers and arms, as far as is known, are new.

Terms such as "up," "down," "bottom," "top," "front," "back," "in," "out" and the like are applicable to the embodiments shown and described in conjunction with the drawings. These terms are merely for the purpose of description and do not necessarily apply to the position in which the pot and arm may be constructed or used.

While particular embodiments of the receiving member and arms have been shown and described it is to be understood the invention is not limited thereto since modifications may be made within the scope of the accompanying claims and protection is sought to the broadest extent the prior art allows.

What is claimed is:

1. A pot-holder assembly for holding flowers, plants and the like and characterized in that a plurality of pot holding arms are removably mounted in a receiving member, the assembly including: (a) a receiving member having a semicircular configuration with a determined inner diameter ring-like portion and an outer periphery and rim portion; (b) a plurality of like slots formed in the outer periphery of the rim portion of said receiving member, each of said slots open to the top of the receiving member, and providing on each side of the slot a rim portion providing a retaining shoulder means; (c) means for retaining the outer peripheral rim in spaced alignment with the inner ring-like portion; (d) securing means provided on the semicircular member enabling one semicircular member to be secured to a like member to form a ring-like receiving member, said securing means also enabling the semicircular member to be fastened to a wall; (e) at least one arm with an outer means for engaging and supporting a bail, chain and the like by which a pot and the like may be hung from an arm that is removably mounted in and on the receiving member; (f) said arm having two rib portions on each side of a theoretical center line of the arm, these rib portions engaging the outer peripheral rim at least on its inner surface of the rim and at two spaced-apart portions, and (g) means provided on said arm and cooperatively arranged in spaced array from said rib portions to maintain the mounted arm in a determined attitude and position on the receiving member.

2. A pot-holder assembly as in claim 1 in which the slots in the outer peripheral rim extend only to a bottom support disc and the end of the arm mounted in the slot in the receiving member has additional ribs which engage portions of the outer peripheral rim adjacent the formed slot.

3. A pot-holder assembly as in claim 2 in which the arm is formed at its inner mounting end with two pairs of spaced-apart ribs on each side of a center web, each pair spaced to engage inner and outer surfaces of the peripheral rim and the web entering into and seating in the slot.

4. A pot-holder assembly as in claim 3 in which the arm is formed with a top stiffener which provides a stop limit for the entrance of the arm into the slot.

5. A pot-holder assembly as in claim 2 in which the receiving member additionally has stiffening and supporting ribs which extend between and join the inner and outer wall portions.

6. A pot-holder assembly as in claim 1 in which the securing means provided in the semicircular member includes ear end portions and apertures therein through which the shank of a bolt, screw and the like pass for securing the said member in a determined position.

7. A pot-holder assembly as in claim 1 in which the slots in the outer peripheral rim portion extend through this rim and these outer rim portions are retained and supported at the inner ring-like portion by a stiffening rib which is joined with the outer rim segment to form a T-shaped member.

8. A pot-holder assembly as in claim 7 in which the outer rim segments are trapozidal in configuration with the larger portion being toward the bottom of the mounted retainer and providing a tapered seating means, the inner end of the arm having side portions adapted to engage and seat on this tapered seating means.

9. A pot-holder assembly as in claim 8 in which the arm end additionally engages the top of the T-shaped outer rim portion to establish the downward limit of travel of the arm on the T-shaped outer rim segment.

10. A pot-holder assembly as in claim 9 in which the inward end of the arm is bifurcated to form two leg portions which are bent inward toward each other to engage the inner surface of the T-shaped segment, these legs are then bent to lay against the stiffening rib by which the T-shaped outer rim segments are secured to the inner ring-like portion.

11. A pot-holder assembly as in claim 8 in which the sides of the arm have tab portions displaced therefrom, these tabs engaging the outer surface of a T-shaped outer rim segment while the inward end of the arm is bifurcated to form two leg portions which are bent inwardly toward each other to engage the inner face of the T-shaped outer rim segments.

12. A pot-holder assembly as in claim 8 in which the inner end of the arm is bifurcated with each portion first bent inwardly toward each other to engage the inner face of the T-member and then bent inwardly to provide a leg portion of sufficient length to engage the outer face of the inner ring.

13. A pot-holder assembly as in claim 1 in which the slots in the outer peripheral rim extend the full extent of the rim and these rim portions are each retained in place by stiffening and supporting ribs which extend between and join the outer and inner wall portions.

14. A pot-holder assembly as in claim 13 in which the securing means provided in the semicircular member includes ear end portions and apertures through which the shank of a bolt, screw and the like pass for securing said member in a determined position.

15. A pot-holder assembly as in claim 14 in which the inner arm end has at least one tab which engages the top of the shaped outer rim to limit the downward travel of the arm and the inner end of the arm is bifurcated with each portion first bent inwardly toward each other to provide engaging means for the inner face of the T-member and then each end of the arm is bent inwardly to provide a leg portion of sufficient length to engage the outer face of the inner ring.

16. A pot-holder assembly as in claim 15 in which the inwardly extending ends of the arm are bent outwardly at the tip portion so as to provide tab portions which in a mounted condition engage the outer face of the inner ring portion to establish the inner support shoulder for the mounted arm.

17. A pot-holder assembly as in claim 1 in which there are two receiving members joined to form a circular receiving member whose inner diameter is a slip fit on a pipe, pole and the like, this circular receiving member retained in a desired and selected position on the pole by a clamp member which provides a supporting surface for the circular receiving member.

18. A pot-holder assembly as in claim 1 in which the receiving member is made from sheet material and as a die form has inner and outer turned tabs extending from a plate member.

19. A pot-holder assembly as in claim 1 in which the arm is made from sheet material with the arm having a channel configuration with the arm in mounted condition having side portions extending upwardly from a bottom member.

20. A pot-holder assembly as in claim 19 in which the arm has in-turned end portions disposed to engage the inside surfaces of the outer rim portions and tabs extending inwardly from the side portions and disposed to engage the outer face of the rim portion to position the arm on said rim portion.

* * * * *